United States Patent [19]

Valette

[11] Patent Number: 5,035,520
[45] Date of Patent: Jul. 30, 1991

[54] DEFORMABLE SELF-ADJUSTING BALL BEARING CAGE

[75] Inventor: Michel Valette, Seynod, France

[73] Assignee: S.N.R. Roulements, Annecy, France

[21] Appl. No.: 515,846

[22] Filed: Apr. 10, 1990

[30] Foreign Application Priority Data

Apr. 18, 1989 [FR] France .................. 89 05097

[51] Int. Cl.⁵ .................. F16C 33/38; F16C 33/41
[52] U.S. Cl. .................. 384/526; 384/531
[58] Field of Search .......... 384/523, 526, 531, 533

[56] References Cited

U.S. PATENT DOCUMENTS

| | | | |
|---|---|---|---|
| 4,019,790 | 4/1977 | Earsley et al. | 384/526 |
| 4,169,636 | 10/1979 | Hooper . | |
| 4,278,307 | 7/1981 | Olschewski et al. | 384/531 X |
| 4,938,613 | 7/1990 | Griffin et al. | 384/526 |

FOREIGN PATENT DOCUMENTS

| | | | |
|---|---|---|---|
| 1806341 | 4/1959 | Fed. Rep. of Germany . | |
| 2320455 | 3/1977 | France . | |
| 2507715 | 12/1982 | France . | |
| 107117 | 8/1980 | Japan | 384/531 |
| 1370890 | 10/1974 | United Kingdom . | |

Primary Examiner—Thomas R. Hannon
Attorney, Agent, or Firm—Oblon, Spivak, McClelland, Maier & Neustadt

[57] ABSTRACT

Self-adjusting ball bearing cage consists of a ring (1), cavities (6) distributed circumferentially and coming out on a face (3) of the ring, spherical housings (4) openings on other face (2) of the ring, and rigid ball holding tabs (7) adjacent to each housing (4) and extending axially from the face of the ring. The tabs (7) of two adjacent housings (4) are connected by an undeformable partition (10) which is axially limited in the direction of face (3) of the ring by the bottom of cavity (6). Each cavity is positioned between two discontinuities of the face (3) formed by elastically deformable pads (13) limited by the bottom of corresponding housing (4).

3 Claims, 3 Drawing Sheets

FIG.I

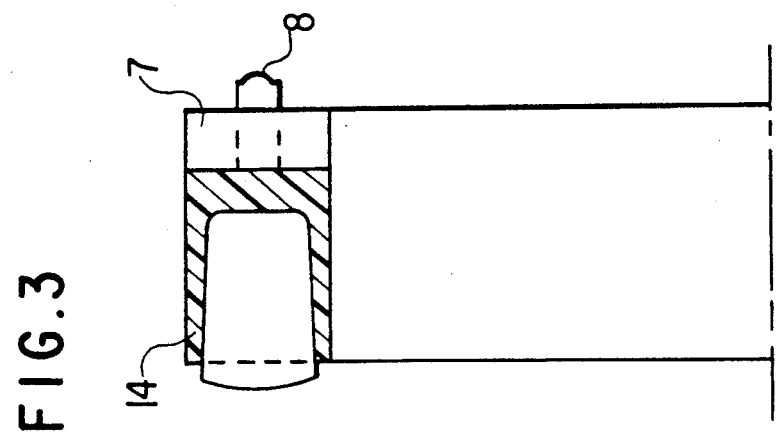
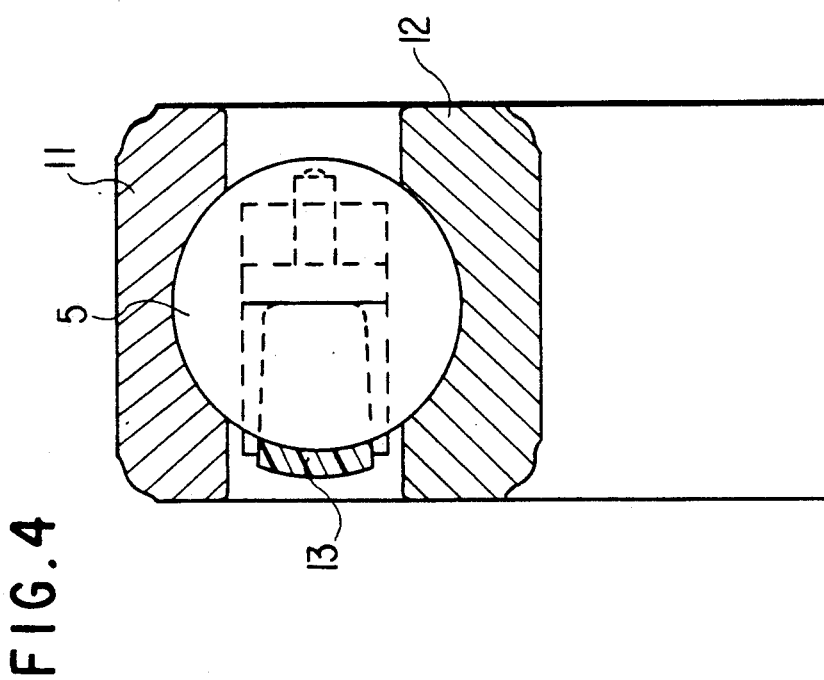

DEFORMABLE SELF-ADJUSTING BALL BEARING CAGE

BACKGROUND OF THE INVENTION

1. Field of the Invention

The invention relates to a self-adjusting ball bearing cage of the type comprising a ring having cavities distributed circumferentially along a face of the ring, the cavities forming spherical housings. The housings are open on a face of the ring and are extended in the axial direction from that face of the ring by ball holding tabs adjacent to each housing. The invention relates more particularly to such a cage formed of locally deformable plastic material.

2. Description of the Related Art

U.S. Pat. No. 4,019,790 describes a cage in which the flexibility of the holding tabs facilitates the introduction of the balls into their housings.

French Publication FR-A-2507715 describes a cage in which a barrier is placed between the adjacent housings and extends in the axial direction from the same face of the ring as do the adjacent flexible tabs. This arrangement facilitates the adjustment of the cage relative to the balls and in particular avoids the crushing of the tabs.

During the operation of the bearing, the stresses exerted by the balls on the cage are able to cause, in some cases, the ejection of the balls from the cage as a result of exaggerated flexure of the tabs or their breaking, particularly when the material of the cage contains a filler (e.g., glass fiber) intended to improve its physical and mechanical characteristics (e.g., heat resistance, dimensional stability).

SUMMARY OF THE INVENTION

The present invention has as its object a cage of the type defined above in which the dangers of ejection and breaking of the tabs are eliminated.

According to the invention, the rigid tabs of two adjacent housings are connected by an indeformable partition which is axially limited in the direction of the bottom face of the ring by the bottom of a cavity positioned between two discontinuities of said bottom face, the discontinuities being formed by elastically deformable pads of an axial thickness limited by the bottom of the corresponding housing of the ball.

The cage thus constituted can be deformed at its base in the direction to cause enlargement of the housings to obtain a sufficient spacing of the holding tabs for the introduction of balls into said housings.

Another advantage of the cage resides in the fact that the deformation of the base of the ring, resulting from the deformations of the pads, is distributed over the entire ring.

The production of the cage also makes possible a substantial savings of the material and is made easier because of the approximately constant thickness of the cage in its various sections.

Further, the operation of the bearing equipped with this type of cage is improved as a result of the lower inertia of the cage.

BRIEF DESCRIPTION OF THE DRAWINGS

A more complete appreciation of the invention and many of the attendant advantages thereof will be readily obtained as the same becomes between understood by reference to the following detailed description when considered in connection with the accompanying drawings, wherein:

FIG. 3 is a radial section of the cage along line 3—3 of FIG. 2; and

FIG. 4 is a view in axial section of a bearing equipped with the cage according to the invention.

DESCRIPTION OF THE PREFERRED EMBODIMENTS

Figure 1:
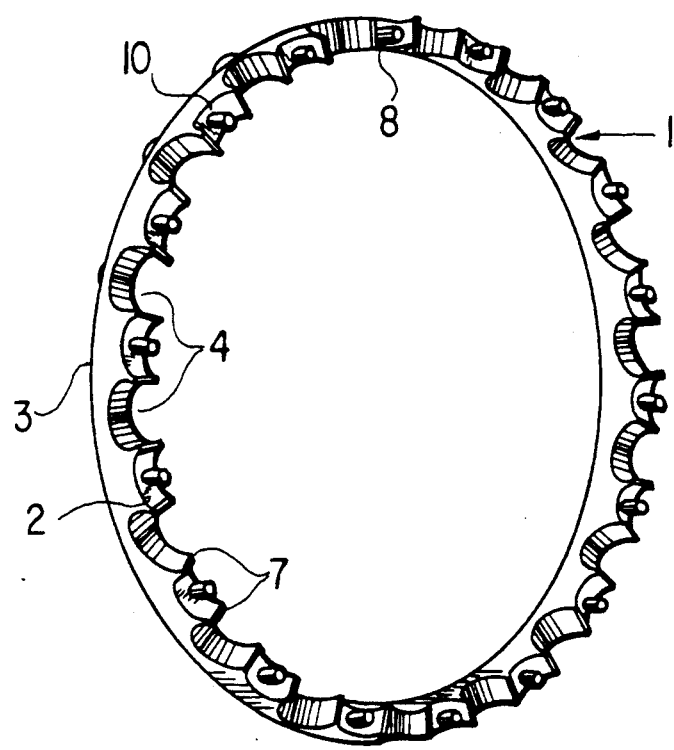
FIG. 1 is a perspective view of a cage according to the invention.
Figure 2:
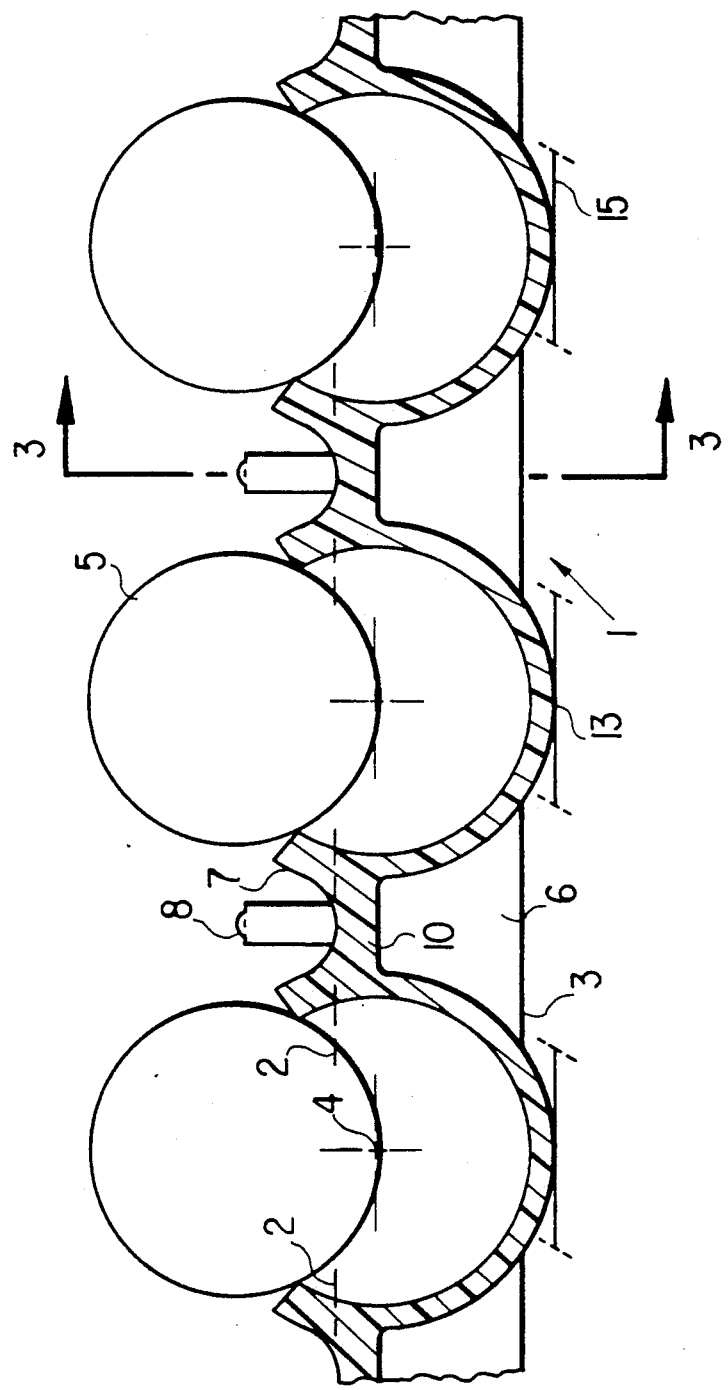
FIG. 2 is a view in partial section of the cage of FIG. 1.

FIG. 1 shows a cage of plastic material consisting of a ring 1 having two axial faces 2, 3. On face 2 are formed spherical housings 4 for receiving balls 5, the housings being uniformly distributed circumferentially. Cavities 6, angularly offset relative to housings 4, are formed in face 3 to define walls of the housings.

Two rigid ball holding tabs 7, placed on opposite edges of each housing 4, extend axially from the plane of face 2. Further, between tabs 7 of each pair of two adjacent housings is positioned a pin 8, facilitating automatic positioning of a ball or the cage during the insertion of balls into their respective housings and their axial holding by tabs 7. According to the invention, tabs 7 of the adjacent pairs of housings are connected by an underformable partition 10 axially limited in the direction of face 3 by the bottom of a respective cavity 6. The partitions are formed, for example, as transverse ribs and are underformable as compared to the housings.

To make possible the assembly of the cage over the balls distributed circumferentially in a space between outside ring 11 and inside ring 12 of a bearing such as the one shown in FIG. 4, each housing extends axially beyond face 3. The portions of the housings extending beyond the face 3 define elastically deformable pads 13 whose axial thickness is limited by the bottom of the corresponding housing.

Provided that the thickness of pads 13, i.e., the bottom wall of the housing, is small enough relative to the diameter of the ball (8% of its diameter) and greater than 0.5 millimeters, it becomes possible to obtain a sufficient spacing of tabs 7 of each housing to make possible the introduction of all the balls 5 into their housings by axially pressing on pads 13 with a specific tool 15, provided that side walls 14 of cavities 6 and housings 4 are also thin enough.

That is, since the pins are immobilized and the partitions are undeformable, the axial force applied by the tool 15 on the pads 13 will cause the ring to locally deform at the housings such that the spacing between the tabs of each housing is enlarged. Thus, the possibility of damage to the tabs 7 is reduced since the distortions necessary to introduce the balls into the housings are not confined to the tabs but are distributed along the length of the ring.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A self-adjusting ball bearing cage, comprising:
   a ring having two axial faces;

a plurality of spherical bearing housings circumferentially distributed on one of said axial faces, said ring extending axially beyond the other of said faces at bottoms of said housings to form a plurality of projecting pads defining discontinuities in said other face;

cavities extending into said ring from said other face and between said discontinuities, whereby walls of said housings are formed in part by said cavities;

a pair of rigid holding tabs projecting substantially axially from said one face at opposite circumferential edges of each of said housings; and an underdermable partition connecting the tabs of each pair of adjacent housings and being axially limited by a bottom of a corresponding one of said cavities, whereby axial pressure on said pads deforms said ring such that a spacing between each said pair of tabs is enlarged to permit insertion of a bearing in a corresponding housing.

2. The cage of claim 1 wherein a thickness of the pads and said part of said housing walls is substantially equal to 0.08 times the housing diameter and is greater than 0.5 mm.

3. The cage of claim 1 including pins projecting axially from each of said partitions.

* * * * *